(12) United States Patent
Koski et al.

(10) Patent No.: US 9,971,844 B2
(45) Date of Patent: May 15, 2018

(54) ADAPTIVE IMAGE LOADING

(71) Applicant: Apple Inc., Cupertino, CA (US)

(72) Inventors: David Koski, San Jose, CA (US); Nikhil Bhatt, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 458 days.

(21) Appl. No.: 14/169,086

(22) Filed: Jan. 30, 2014

(65) Prior Publication Data

US 2015/0212655 A1 Jul. 30, 2015

(51) Int. Cl.
G06F 17/30 (2006.01)
G06T 1/00 (2006.01)
G06F 3/0481 (2013.01)
H04N 1/333 (2006.01)

(52) U.S. Cl.
CPC .... G06F 17/30902 (2013.01); G06F 3/04817 (2013.01); G06F 17/30244 (2013.01); G06T 1/0007 (2013.01); H04N 1/333 (2013.01)

(58) Field of Classification Search
CPC .......... G06F 3/04817; G06F 17/30244; G06F 17/30902; G06T 1/0007; H04N 1/333
See application file for complete search history.

(56) References Cited

U.S. PATENT DOCUMENTS

| 5,983,263 | A * | 11/1999 | Rothrock | ............... | H04N 7/147 348/E7.081 |
| 8,472,789 | B2 | 6/2013 | Shiomi et al. | | |
| 2003/0110182 | A1 * | 6/2003 | Christophersen | . | G06F 17/30244 |
| 2007/0013708 | A1 * | 1/2007 | Barcklay | ........... | G06F 17/30902 345/557 |
| 2007/0237402 | A1 * | 10/2007 | Dekel | ................... | G06F 19/321 382/232 |
| 2011/0214072 | A1 * | 9/2011 | Lindemann | ........... | G01C 11/02 715/757 |
| 2011/0221780 | A1 * | 9/2011 | Inada | ...................... | G09G 5/36 345/660 |
| 2012/0016933 | A1 * | 1/2012 | Day | ..................... | H04L 63/102 709/203 |
| 2012/0188280 | A1 * | 7/2012 | Charlebois | ................ | G06T 3/40 345/634 |
| 2012/0206775 | A1 | 8/2012 | Sung et al. | | |
| 2013/0145306 | A1 | 6/2013 | Shore et al. | | |
| 2014/0358877 | A1 * | 12/2014 | Hsiao | .................. | G06F 17/3028 707/695 |

FOREIGN PATENT DOCUMENTS

WO 2013/075592 5/2013

* cited by examiner

*Primary Examiner* — Amy Ng
*Assistant Examiner* — Sajeda Muhebbullah
(74) *Attorney, Agent, or Firm* — Fish & Richardson P.C.

(57) ABSTRACT

Adaptive loading of images is described. In some implementations, the process of loading of images by a computing device can be adapted to account for image size, image load times and/or user behavior. In some implementations, the process of preloading of images can be adapted to account for image size and/or user behavior. In some implementations, presentation of an image loading indicator can be adapted to account for image size and/or amount of time required to load an image.

22 Claims, 11 Drawing Sheets

ADAPTIVE IMAGE LOADING

TECHNICAL FIELD

The disclosure generally relates to displaying images on a computing device.

BACKGROUND

Loading images into memory for display on a computing device can be a slow process that can cause the user to experience a delay between when the user selects to view an image and when the image is actually presented to the user. One mechanism for reducing the delay in presenting an image is to store, load and present different resolution or sized versions of the same image and sequentially load the images from smallest (fastest loading) to largest (slowest loading). For example, thumbnail, preview and master versions of a particular image can be stored on a computing device. The preview can be larger than the thumbnail and the master can be larger than the preview, for example. To reduce the amount of delay experienced by the user, the computing device can be configured to initially load and display the smaller faster loading thumbnail, the preview second and the master last. However, presenting this sequence of image versions (e.g., thumbnail, preview, master) can increase the amount of time needed to present the master for editing by the user and can increased the amount of resources needed to display an image.

SUMMARY

Adaptive loading of images is described. In some implementations, the process of loading of images by a computing device can be adapted to account for image size, image load times and/or user behavior. In some implementations, the process of preloading of images can be adapted to account for image size and/or user behavior. In some implementations, presentation of an image loading indicator can be adapted to account for image size and/or amount of time required to load an image.

In some implementations, the loading of previews can be skipped when the computing device determines that the preview load time and the master load time are similar. In some implementations, the computing device can determine how long it takes for the computing device to load an image and estimate (predict) the actual amount of time needed to load subsequent images. For example, the computing device can determine how long on average it takes to load previews and/or masters based on the loading times of previous previews and/or masters. In some implementations, the computing device can determine an amount of time that a user dwells on each image as the user navigates between images. The computing device can use the dwell time to determine if the computing device should wait to load the preview and/or master versions of an image. In some implementations, the computing device will display a loading indicator when the load time for an image is greater than a threshold period of time.

Particular implementations provide at least the following advantages: The time delay between when a user selects to view an image and when the image is ready for editing can be reduced. The computing resources needed to display an image can be reduced by preventing the loading of preview and/or master versions of the image when the user is likely to navigate away from the image before the preview and/or master versions of the image fully load. The amount of time needed to display the master version of the image can be reduced by skipping previews when the load time required for displaying masters and previews is about the same.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

This disclosure describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Terms

The following terms will be used throughout this specification:

Master—The 'master' is the image that the user imported. It might be a JPEG, TIFF or RAW image, for example. The master image is unadjusted, modified and/or edited, although it may contain simple adjustment information like orientation or rotation.

Adjustments—Adjustments are edits that the user applies to the image (e.g., contrast, exposure, cropping, etc.)

Rendered—A rendered image includes the master plus whatever adjustments have been made by the user. The rendered image is the edited image. A rendered image can be transient (e.g., rendered as needed during runtime). A rendered image can be saved to a file.

Thumbnail—A thumbnail can be a small, typically JPEG, version of the rendered image. For example, the thumbnail can be a 1024×768 pixel rendered image. The thumbnail can be a smaller (e.g., 1024×768 pixel) version of the master.

Preview—The preview can be a version of the rendered image that is larger than the thumbnail. For example, the preview is typically larger than 1024×768 pixels and may be as large as the master. The preview can have a fixed, configured maximum size (e.g., 4096 pixels on the long side). The preview can be a smaller version of the rendered image. The preview can be a smaller version of the master (e.g., without adjustments).

The thumbnail, preview and master all refer to images that are stored in non-volatile memory (e.g., hard disk, flash memory, network storage, cloud storage, etc.). The rendered image may or may not be stored in non-volatile memory. The rendered image may be rendered and loaded into volatile memory without saving the rendered image to non-volatile memory. The thumbnail and preview may be scaled versions of the rendered image, for example.

Figure 1:
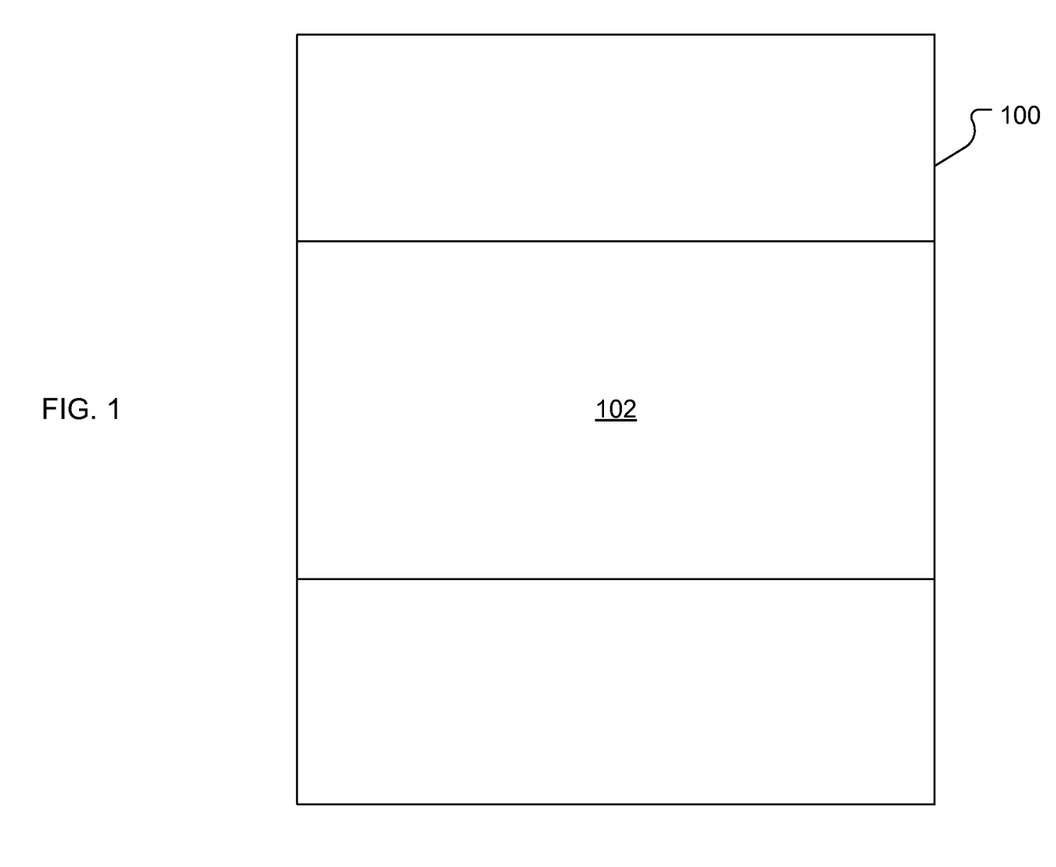
FIG. 1 illustrates an example graphical user interface for displaying images on a display of a computing device.

FIG. 1 illustrates an example graphical user interface 100 for displaying images on a display of a computing device. For example, GUI 100 can be a user interface of an image editing application. In some implementations, GUI 100 can present a view 102 for presenting images (e.g., thumbnail, master, preview) on GUI 100. For example, view 102 can present an image from a user's image library. The image can be a RAW image file, a TIFF image, a JPEG image or an image that conforms to any other format. The view 102 can present an image stored on the computing device or on storage accessible to the computing device (e.g., external hard drive, network storage, cloud storage, etc.). The image can be stored in various versions. For example, a thumbnail, a preview and/or a master version of the image can be stored on the computing device. When an image is selected, the view 102 can present the thumbnail, preview and/or master versions of the image as described below.

Figure 2:
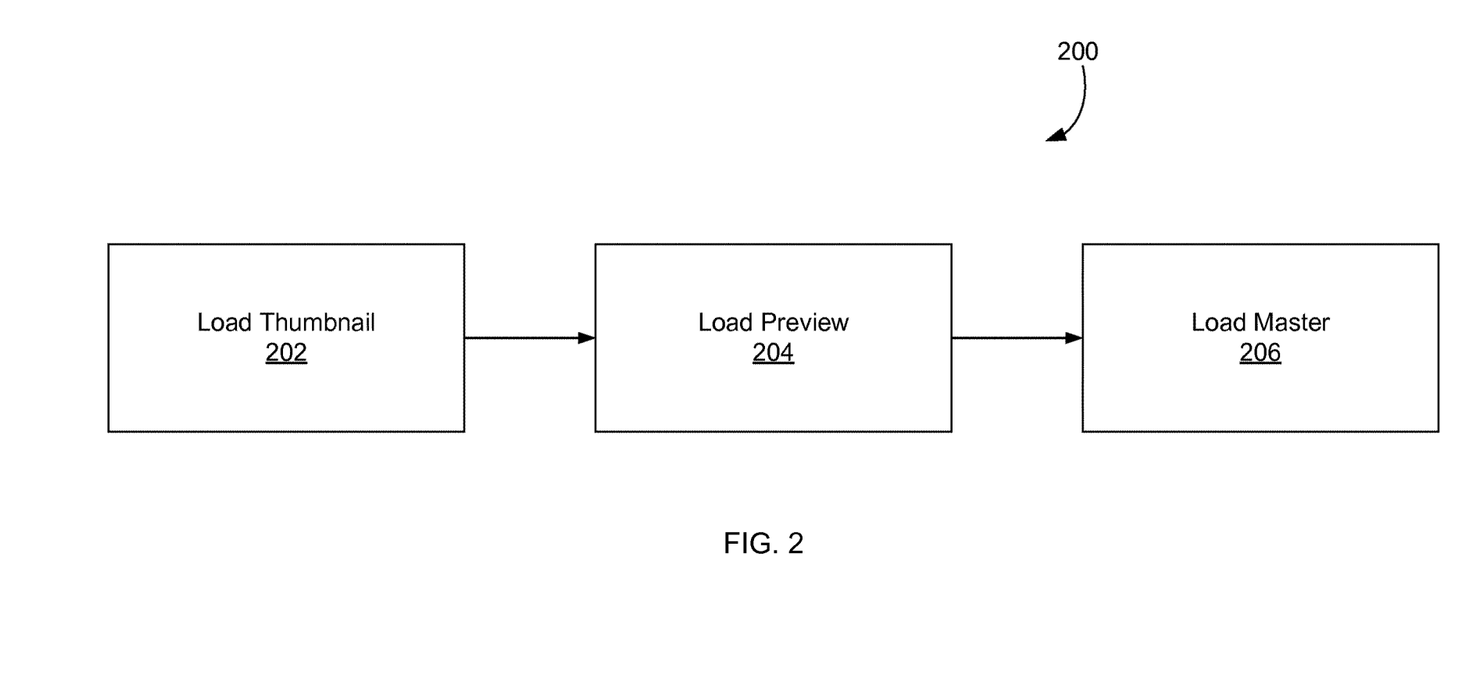
FIG. 2 illustrates an example process for loading an image for display on a graphical user interface.

FIG. 2 illustrates an example process 200 for loading an image for display on a graphical user interface. For example, process 200 can reduce the amount of delay perceived by a user when the user selects an image to view on GUI 100. At step 202, in response to a user selecting an image to view, the computing device can load the thumbnail version of the image into memory and display the thumbnail on a display of the computing device. Because the thumbnail is small in size, the thumbnail will load quickly and allow the user to view the selected image with less delay between the selection of an image and the presentation of the image.

At step 204, the preview version of the image can be loaded into memory. For example, the preview version of the image can be loaded into memory and displayed after the thumbnail version of the image is loaded and displayed. Often, the preview will be at a higher resolution than the thumbnail. Thus, the user will perceive a better quality picture once the preview is displayed. Also, since the preview is often smaller in size and/or requires less processing than the master, the preview will often load faster than the master.

At step 206, the master version of the image can be loaded into memory. For example, the master can be a RAW image that requires more processing power and more memory to load and render on the display. Also, any adjustments may be added to the RAW image when the master is loaded. Thus, the master may take longer to load than the thumbnail and preview. By loading thumbnail, preview and master versions of the selected image, as described above, the user will not have to wait very long for the selected image to be displayed (e.g., the thumbnail is almost immediately displayed). However, because both thumbnail and preview versions of the image are loaded before an editable version (e.g., master version) of the image is displayed, the user may need to wait longer before the user is able to edit the image in the image editing application.

Figure 3:
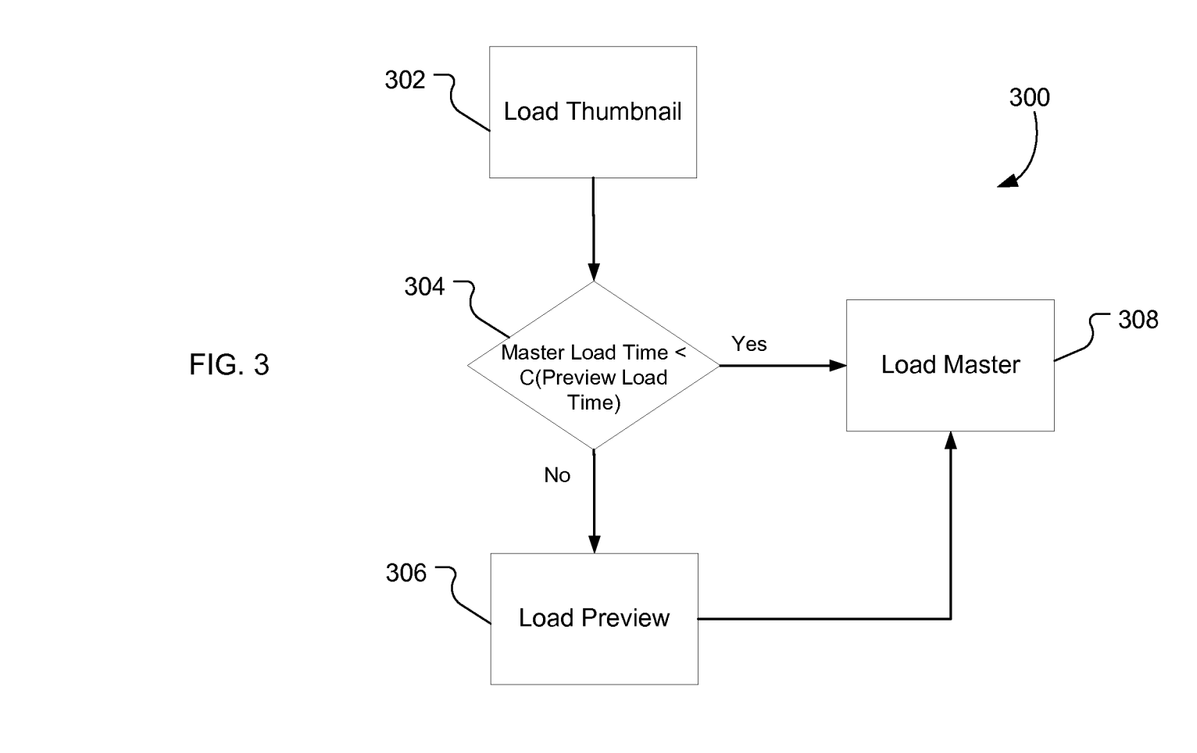
FIG. 3 is a flow diagram of an example process for adapting image loading to image load time.

FIG. 3 is a flow diagram of an example process 300 for adapting image loading to image load time. For example, the computing device can determine which version of an image (e.g., preview or master) should be loaded based on the load times associated with the respective versions. In some implementations, the computing device can collect metrics that indicate average load times for images. For example, the average load time can correspond to the mean, median or mode of collected sample load times. The computing device can, for example, keep track of the amount of time that it took to load the last 5 images in each category or image type. For example, the computing device can determine how much time it took to load the last 5 previews (e.g., JPEG images). The computing device can determine how much time it took to load the last 5 masters (e.g., RAW images and adjustments). The computing device can determine how much time it took to load the last 5 images of JPEG, TIFF or other image format. The computing device can use the average load times to estimate or predict the load time for subsequent images. In some implementations, the computing device can calculate the amount of bytes, megapixels, etc., loaded per second for each image type. The computing device can use the bytes or megapixels per second metric (e.g., load speed) to estimate or predict load times for subsequent images.

At step 302, the computing device can load a thumbnail version of a selected image. For example, the user can select an image from an image gallery. The user can select an image by navigating to the previous or next image in a sequence of images. In response to the user selecting an image, the computing device can load a thumbnail version of the selected image.

At step 304, the computing device can compare the estimated load time for master and preview versions of the selected image. For example, estimated load time for masters can be the average of the load times of the previous five masters. The estimated load time for previews can be the average of the load times of the previous five previews.

In some implementations, the computing device can calculate an image load speed (e.g., bytes or megapixels per second) for each type (format) of image. For example, for each image format (e.g., JPEG, TIFF, etc.), the computing device can measure how much time it takes to load an image and divide the image size by the time to get the image load speed (e.g., bytes/second, megapixels/second, etc.). The computing device can then use the image load speed to determine how long it will take to load subsequent images of the same type. For example, if a subsequent image has a size of 1,000 bytes, then the computing device can multiply the image by the inverse of the speed (e.g., seconds/bytes, seconds/megapixels, etc.) to determine the estimated load time for the image. Since images of different formats load at different speeds, the computing device can keep track of load speeds for each different image format. Also, since images loaded from different storage devices (e.g., disk drive, flash memory, network or cloud storage, etc.) load at different speeds, the computing device can keep track of load speeds for each different image format loaded from each different storage device or storage location.

Once the estimated load time for the master is determined and the estimated load time for the preview is determined, the master load time and the preview load time can be compared. For example, if the master load time is less than the preview load time multiplied by some constant or coefficient (e.g., master <2(preview)), then the master can be loaded at step 308. Thus, process 300 provides for skipping or bypassing the loading and displaying of the preview version of the selected image when the master version of the selected image is similar (e.g., within some multiple) in size to the preview version of the selected image. If the master load time is greater than the preview load time multiplied by some constant or coefficient (e.g., two), then the preview can be loaded at step 306. Once the preview is loaded and displayed, then the computing device can proceed to load and display the master at step 308.

In some implementations, the master can be loaded without first loading the thumbnail and preview. For example, if the master can be loaded within a period of time (e.g., threshold period of time, configured period of time, dwell period, 0.5 seconds, etc.) and there are few, if any, adjustments, then the master can be loaded immediately when a corresponding image is selected without loading the thumbnail and/or preview versions of the image first.

Figure 4:
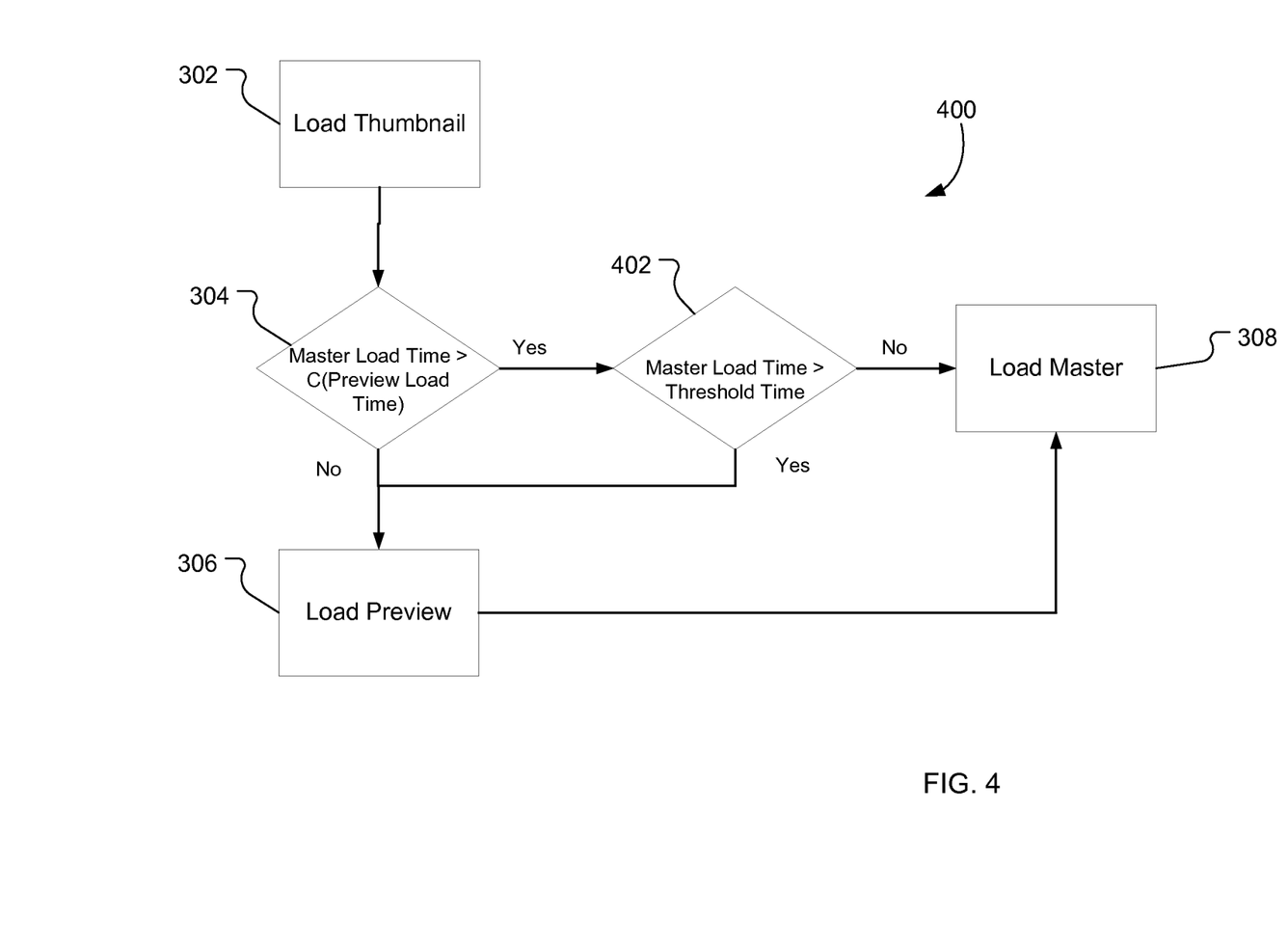
FIG. 4 is a flow diagram of an example process for adapting image loading to image load time based on a maximum time limit.

FIG. 4 is a flow diagram of an example process 400 for adapting image loading to image load time based on a maximum time limit. For example, process 400 includes steps 302-308 from process 300 and also checks at step 402 whether the estimated master load time is greater than a maximum time limit (e.g., threshold value, 5 seconds). At step 402, if the estimated master load time is greater than a maximum time limit, then at step 306, the preview will be loaded. At step 402, if the estimated master load time is less than or equal to the maximum time limit, then at step 308, the master will be loaded without first loading the preview version of the selected image.

Figure 5A:
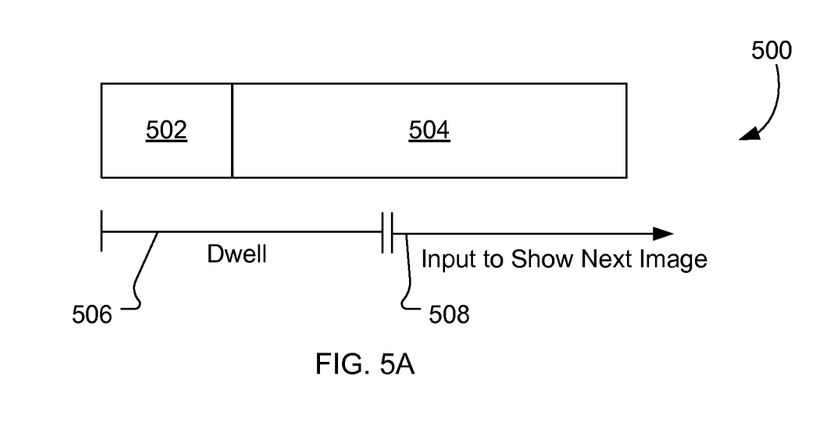
FIGS. 5A and 5B are diagrams illustrating adapting image loading to user behavior.
Figure 5B:
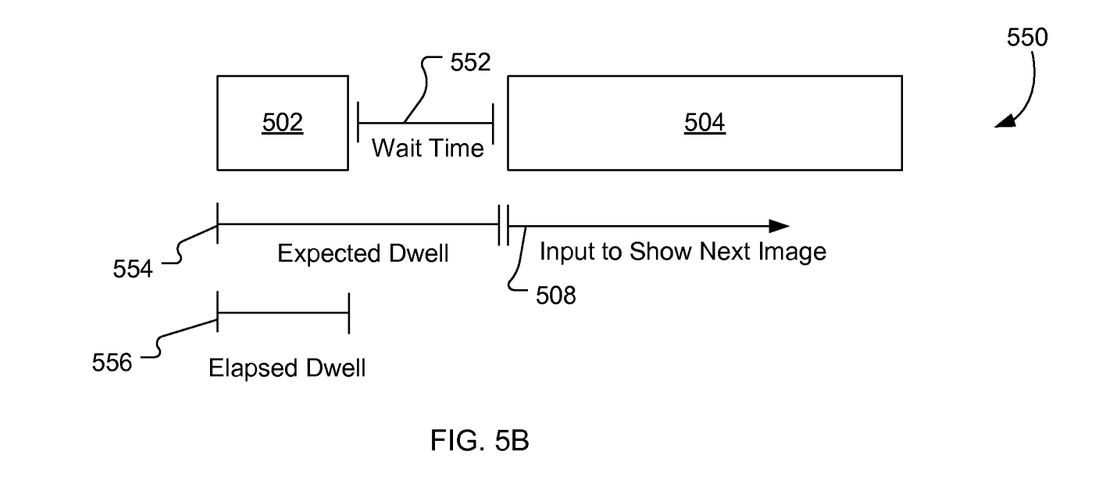

FIGS. 5A and 5B are diagrams 500 and 550 illustrating adapting image loading to user behavior. In some implementations, a preview or master version of an image can be loaded immediately after the thumbnail version of an image is loaded and displayed. In some implementations, the loading of preview or master versions of an image after the thumbnail version of the image is loaded and displayed can be delayed when the system determines that the user may navigate to the next image before the preview or master is done loading. Diagrams 500 and 550 illustrate these concepts.

Diagrams 500 and 550 include items 502 and 504 representing load times for thumbnail version (502) and next version (504) of a selected image. For example, next version 504 can be the preview or master version of the image as determined using processes 300 and 400 described above. Diagram 500 shows item 502 and item 504 abutting or adjacent to each other since in diagram 500 the preview/master (504) is loaded immediately after the thumbnail (502) is loaded and displayed.

Item 506 represents the amount of time that a user dwells on the selected image represented by items 502 and 504. Item 508 represents the point in time where the user navigates to (selects) the next image (e.g., not image version, thumbnail, preview, master) in the user's image library. As illustrated by diagram 500 the user dwells on the selected image for a period of time (506) and then provides input (508) to move to the next image before the preview/master 504 finishes loading. Because the computing device is often unable to stop loading the preview/master before completing the loading, the processing time and resources used to load the preview/master 504 can be wasted when the user moves to the next image before the preview/master 504 finishes loading.

In some implementations, the loading of the preview/master 504 can be delayed for a period of time (e.g., wait period) based on the user's previous behavior. For example, the computing device can determine the average amount of time that the user dwells on a previous number (e.g., five) of images. This average dwell time (i.e., expected dwell time) can be used to determine how much time to wait before displaying the next version (e.g., preview, master) of the image.

In particular, the loading of image versions (e.g., preview, master) can be adapted based on how long a user dwells on each image in an image library. For example, if the user is navigating quickly between images, the computing device will wait a period of time after loading the thumbnail to load the preview/master 504 to give the user time to navigate away from the current image. If the user is navigating slowly (e.g., dwelling for a long time on an image) between images, the computing device will not delay the loading of the preview/master 504 after loading the thumbnail 502 because the user's behavior (e.g., long dwell period) indicates that the user likely wants to see the full resolution image (e.g., preview or master).

Diagram 550 illustrates adapting the timing of image loading to user behavior. Diagram 550 includes item 552 representing a wait time or delay between loading a thumbnail (502) and a preview/master (504). The wait time 552 is calculated by subtracting the elapsed dwell time 556 from the expected dwell time 554. The expected dwell time can be determined by calculating the average amount of time that a user dwells on a previous number (e.g., 5) of images. The expected dwell time can be determined by calculating the average amount of time that the user has dwelled on images over a previous period of time (e.g., last 30 seconds). The elapsed dwell time can be determined from the amount of time that has passed since the computing device began loading thumbnail 502. The elapsed dwell time can be calculated as the amount of time that has passed since the user provided input to navigate to the currently selected image. The computing device can use the measured and calculated average dwell time to avoid loading a preview or master when the user is likely to navigate away from the selected image before the preview or master is able to fully load. Thus, if the computing device can load the preview or master within the expected dwell time (e.g., time period), then the computing device will load the preview or master. If the elapsed dwell period is greater than the expected dwell period, the user has changed behavior (e.g., is dwelling longer than expected and may wish to edit the image) and the computing device can load the preview or master. If the elapsed dwell period is less than the expected dwell period, the computing device can wait until the expected dwell period passes and then load the preview or master. Additional details regarding determining the appropriate wait time are described with respect to FIG. 6, below.

Figure 6:
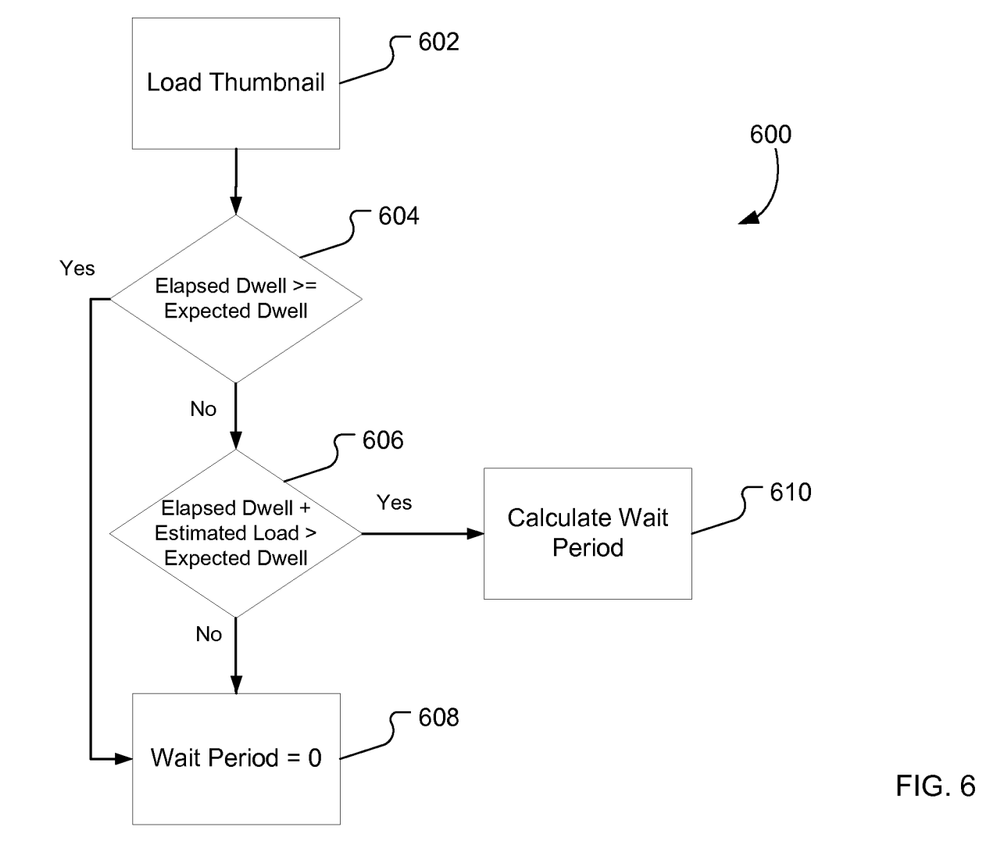
FIG. 6 is a flow diagram of an example process for determining the amount of time to wait between loading a thumbnail and loading the preview or master based on user behavior.

FIG. 6 is a flow diagram of an example process 600 for determining the amount of time to wait between loading a thumbnail and loading the preview or master based on user behavior. At step 602, a thumbnail is loaded and displayed on a display of the computing device. For example, the thumbnail can be loaded in response to the user selecting to view a particular image. The thumbnail can be a smaller and/or lower resolution version of the selected image, for example. The thumbnail can be displayed on GUI 100 of FIG. 1, for example.

At step 604, the computing device can compare the elapsed dwell time to the expected dwell time. For example, the elapsed dwell time can be a period of time measured from when the thumbnail is loaded to the current time. The elapsed dwell time measures how long the user has been looking at the selected image, for example. The expected dwell time is an estimate of how long the user is likely to dwell on an image. The expected dwell time can be calculated by determining the average amount of time that the user has dwelled on each of a previous number of images (e.g., average dwell time for the last 5 images).

If the elapsed dwell time is greater than or equal to the expected dwell time, the computing device can determine that the wait period can be set to zero at step 608. For example, if the elapsed dwell time is greater than or equal to the expected dwell time, then the user is likely to stay with the current image for a longer period of time (e.g., the user has found the image the user was looking for) and the next version of the image (e.g., preview or master) can be loaded without delay.

If the elapsed dwell time is less than the expected dwell time, the computing device can compare the elapsed dwell time and the estimated load time of the next version of the image (e.g., preview, master) to the expected dwell time at step 606.

At step 606, the computing device can compare the elapsed dwell time and the estimated load time of the next version of the image to the expected dwell time. For example, the computing device can compare the sum of the elapsed dwell time and the estimated load time to the expected dwell time (e.g., elapsed dwell+estimated load>expected dwell). The estimated load time can be an average of a previous number of load times. The estimated load time can be calculated based on image loading speed, as described above. The load time can be estimated for the preview or master version of the image depending on which version of the image will be loaded after the thumbnail version of the image, as described above. If the sum of the elapsed dwell time and the estimated load time is less than or equal to the expected dwell time (e.g., the amount of time the user is likely to dwell on the image), then the computing device can set the wait period to zero at step 608. For example, if the sum of the elapsed dwell time and the estimated load time is less than or equal to the expected dwell time (e.g., the amount of time the user is likely to dwell on the image), then the user is likely to dwell on the current image long enough to load the preview or master before moving or navigating away to the next image in the image library.

At step 606, if the sum of the elapsed dwell time and the estimated load time is greater than the expected dwell time, then the computing device can calculate the wait time (i.e., wait period) at step 610. For example, the computing device can calculate the wait period as the difference of the expected dwell time and the elapsed dwell time (e.g., estimated dwell−elapsed dwell=wait time).

In some implementations, the wait period can be subject to minimum and/or maximum values. For example, if the calculated wait period is less than a configured minimum value, the wait period can be set to the minimum value. If the calculated wait period is greater than a configured maximum value, then the wait period can be set to the maximum value. Once the wait period is determined by the computing device using process 600, the wait period can be used to delay the loading of the preview and/or master version of an image after loading the thumbnail version of a selected image, as described above. For example, the computing device will delay loading the preview/master for a period of time corresponding to the wait period.

Figure 7:
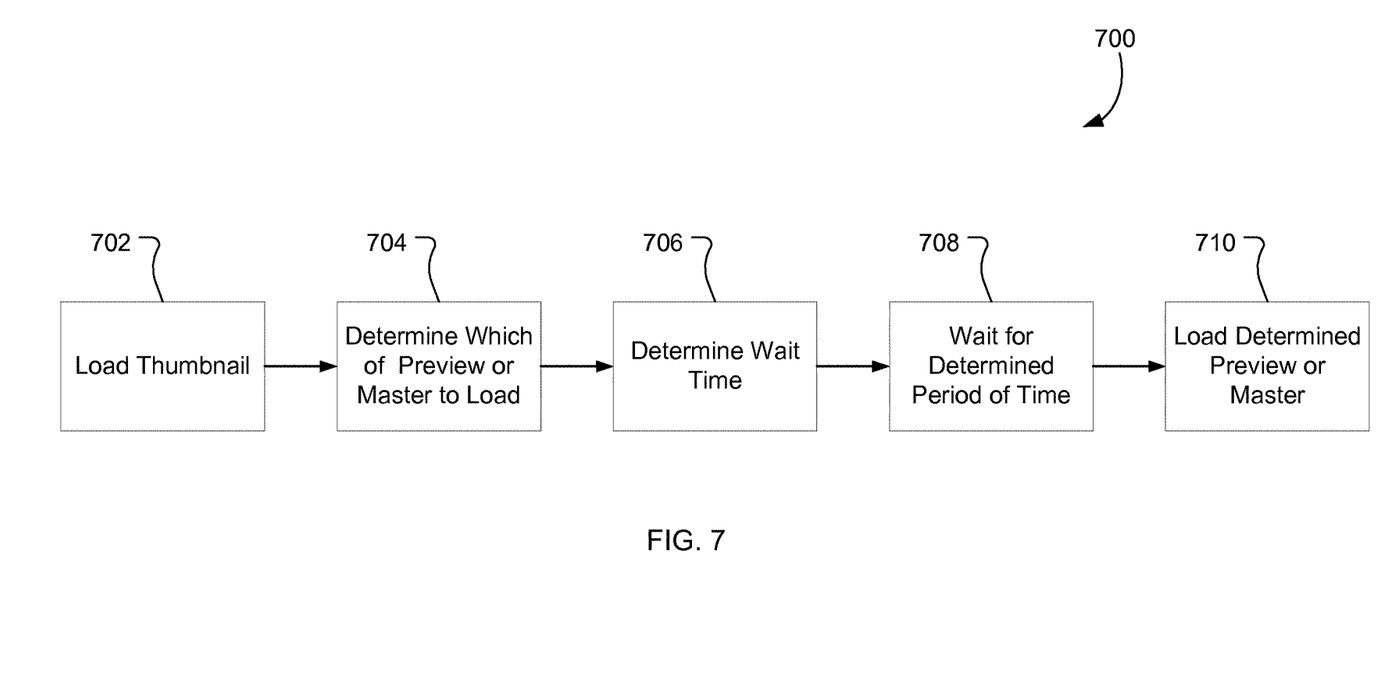
FIG. 7 is a flow diagram of an example process for adaptive image loading.

FIG. 7 is a flow diagram of an example process 700 for adaptive image loading. Process 700 can include some or all of the steps described in processes 300, 400 and 600 above. For example, process 700 combines the image version (e.g., preview or master) selection process described in processes 300 and 400 with the preview/master delay (e.g., wait period) calculations described in process 600.

At step 702, the computing device can load a thumbnail version of a selected image. The thumbnail can be a low resolution and/or smaller sized version of the selected image, for example.

At step 704, the computing device can determine which of the preview or master versions of the selected image to load. For example, after the thumbnail has been loaded and displayed by the computing device, the computing device can select either the preview version of the selected image or the master version of the selected image to load next. The computing device can select the preview or master according to processes 300 and/or 400 described above.

At step 706, the computing device can determine an amount of time to wait between loading the thumbnail and loading the subsequent preview or master. For example, the computing device can determine a wait period according to process 600 described above.

At step 708, the computing device can wait for a determined period of time. For example, the computing device can delay loading the preview or master for the amount of time corresponding to the wait period determined at step 706.

At step 710, the computing device can load and display the determined image version. For example, after the computing device waits (e.g., delays loading) for the determined wait period, the computing device can load the preview or master, as determined by step 704, above. For example, once loaded into memory, the computing device can display the preview or master.

Figure 8:
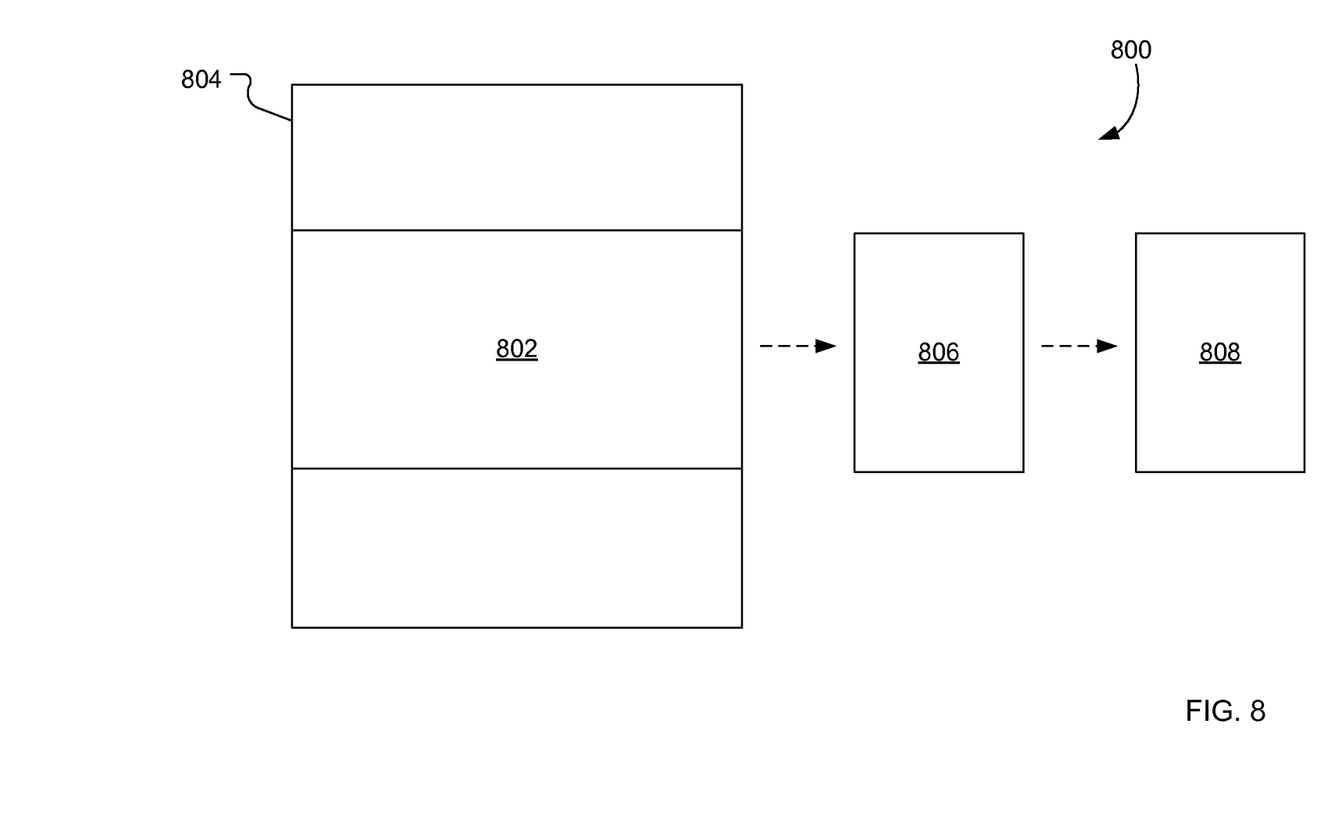
FIG. 8 is a diagram illustrating adaptive preloading of images.

FIG. 8 is a diagram 800 illustrating adaptive preloading of images. For example, the image version (e.g., preview or master) selection processes 300 and/or 400 can be used to determine which versions of an image to preload into memory to enable faster display of images when the user is navigating from image to image in an image library or an image editing application. For example, an image editing application can display an image 802 on a graphical user interface 804 of the image editing application. The user may provide input (e.g., touch an arrow key, select a graphical object, etc.) to navigate between images in an image library accessible to the image editing application.

In some implementations, the computing device can preload a number of images so that the images appear more quickly when the user navigates from image to image. For example, if image 806 and 808 are the next two images to be displayed as the user navigates through a sequence of images in the image library, images 806 and 808 can be preloaded into memory while image 802 is displayed and before the user navigates to images 806 and 808. The computing device can preload a predetermined or configured number (e.g., 3, 5, 10, etc.) of images. The computing device can preload images in the direction in which the user is navigating through images. For example, if the user is navigating forward through a sequence of images, then the computing device will preload images in the forward direction. If the user is navigating backward through a sequence of images, then the computing device will preload images in the backward direction.

In some implementations, images 806 and 808 can be preloaded into memory using processes similar to processes 300 and 400, described above. For example, thumbnail versions of images 806 and 808 can be loaded into memory first. Then, based on the relative sizes of preview and master versions of images 806 and 808, the computing device can load either the preview or master versions of the images 806 and 808 into memory, as described in detail with reference to processes 300 and/or 400 above. Thus, in some implementations, instead of preloading thumbnail then preview then master versions of images 806 and 808, the computing device can skip preloading the preview and load the master versions of images 806 and 808 after preloading the thumbnail versions of the images when the preview and master will load in a similar amount of time.

Figure 9:
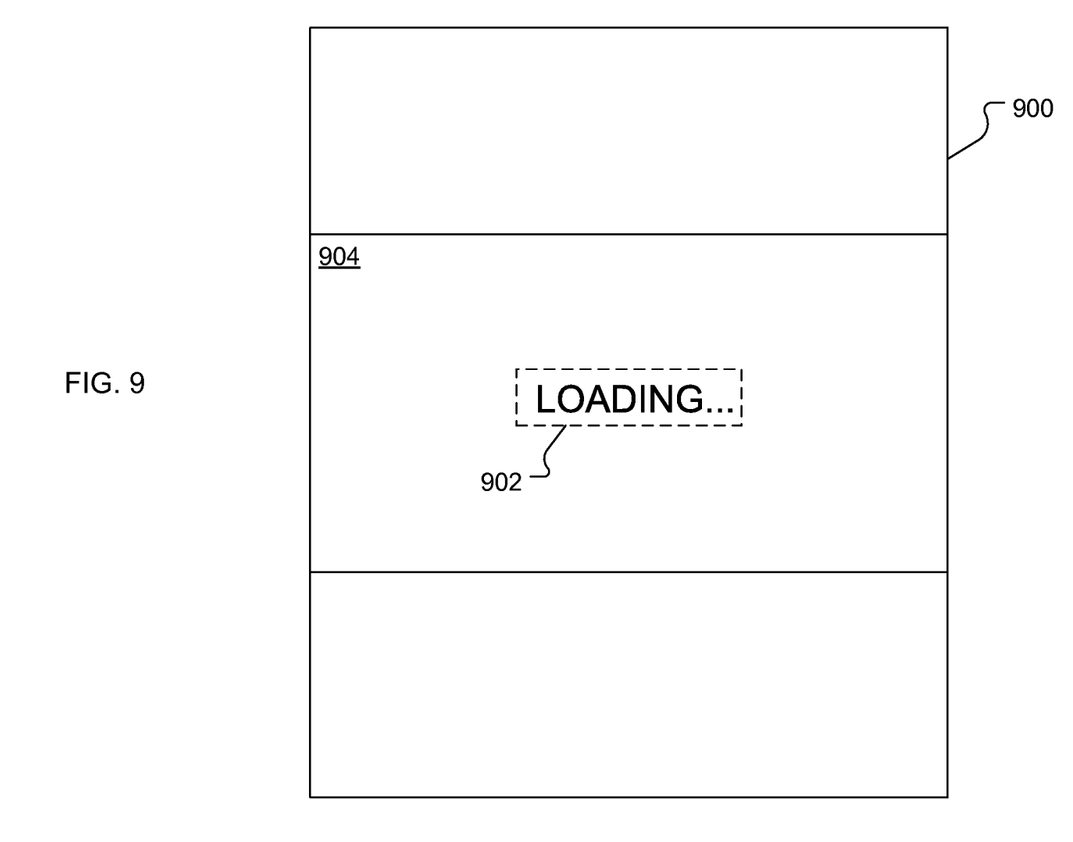
FIG. 9 illustrates an example graphical user interface presenting an image loading indicator.

FIG. 9 illustrates an example graphical user interface 900 presenting an image loading indicator. For example, the image editing application can present loading indicator 902 on GUI 900 while the computing device is loading image 904 into memory. For example, the loading indicator 902 can be displayed while the computing device is loading thumbnail, preview and/or master versions of image 904. The loading indicator 902 can be an icon, an animated image or any other graphical object for indicating that the computing device is in the process of loading image 904. Once image 904 is loaded and displayed on GUI 900 (e.g., once the master version of image 904 has been loaded and displayed), the loading indicator 902 can be removed from GUI 900. The loading indicator 902 can be removed from GUI 900 when the user provides input to navigate to the next image in the image library.

Figure 10:
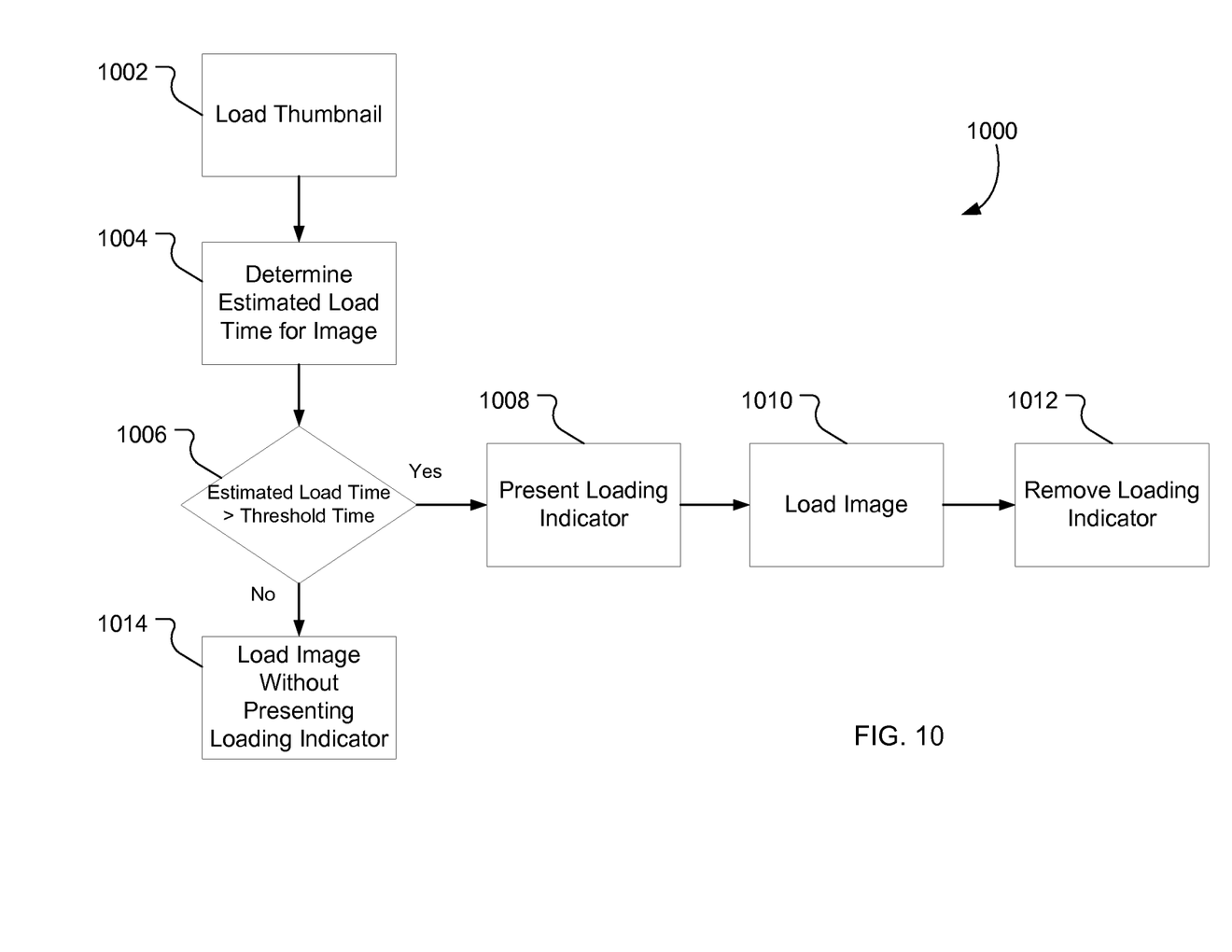
FIG. 10 is an example process for determining when to display the image loading indicator.

FIG. 10 is an example process 1000 for determining when to display the image loading indicator. For example, process 1000 can be implemented by the computing device to determine when to present loading indicator 902 on GUI 900 of FIG. 9. At step 1002, the computing device can load a thumbnail version of a selected image. For example, the computing device can load the thumbnail version of the selected image into memory and display the thumbnail in response to the user selecting to view the selected image.

At step 1004, the computing device can determine the estimated load time for the image. For example, if the preview is to be loaded after the thumbnail, then the computing device can determine the estimated load time for the preview. Alternatively, if the preview is to be loaded after the thumbnail, then the computing device can determine the combined estimated load time for the preview and the master since the master will be loaded after the preview. If the master is to be loaded after the thumbnail, then the estimated load time for the master can be determined. The estimated load time can be calculated based on the measured load times of previous images having the same image format, as described above.

At step 1006, the computing device can determine if the estimated load time is greater than a threshold time limit. For example, the threshold time limit can be a configured value (e.g., number of seconds). If the estimated load time is less or equal to than the threshold time limit, then the computing device can load the image (e.g., image version, preview, master) without displaying the loading indicator at step 1014.

If the estimated load time is greater than the threshold time limit, then the computing device can present the loading indicator at step 1008. When the computing device is finished loading the image (e.g., master version of the image is loaded) at step 1010, the computing device can remove the loading indicator from the display at step 1012.

Example System Architecture

Figure 11:
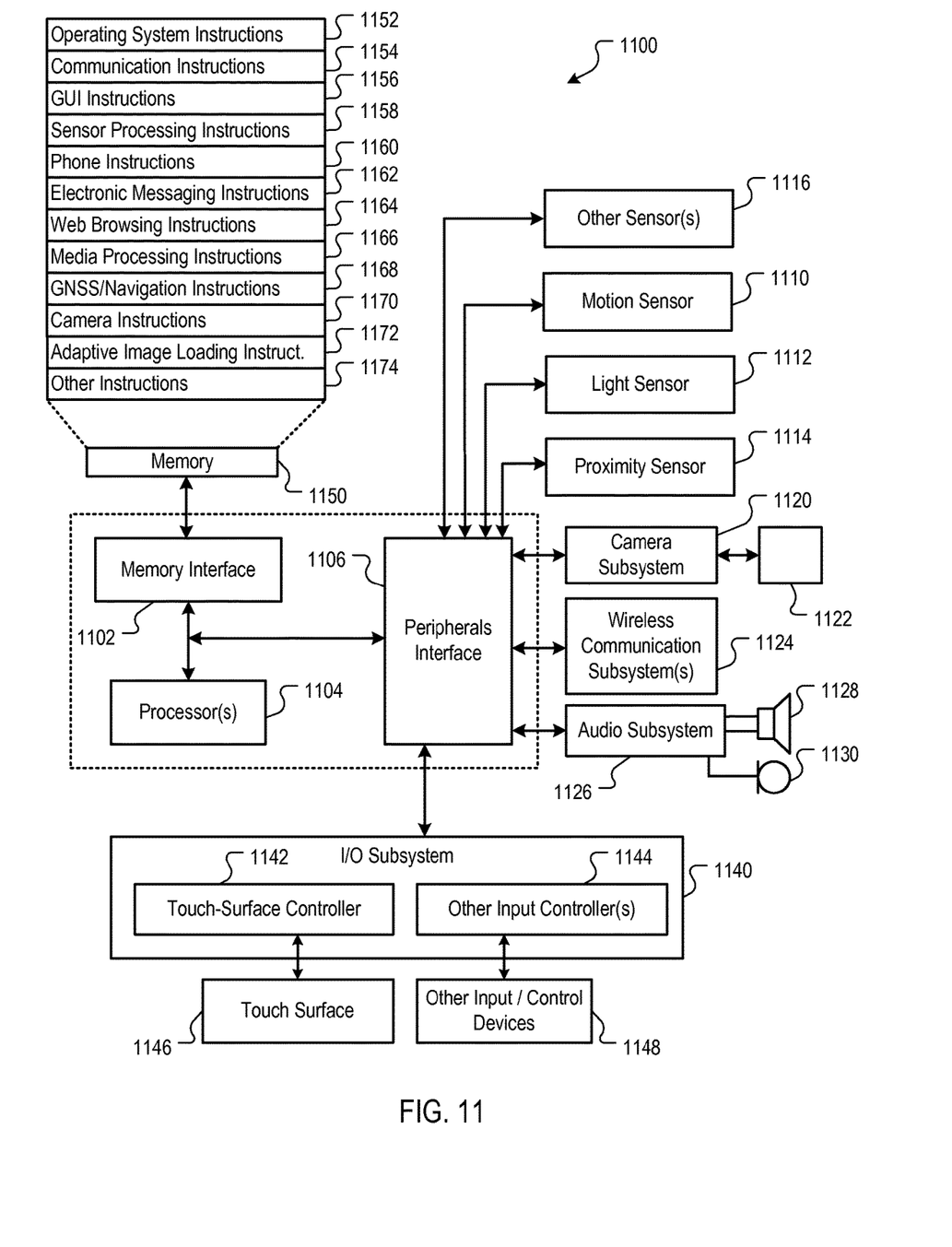
FIG. 11 is a block diagram of an example computing device that can implement the features and processes of FIGS. 1-10.

FIG. 11 is a block diagram of an example computing device 1100 that can implement the features and processes of FIGS. 1-10. The computing device 1100 can include a memory interface 1102, one or more data processors, image processors and/or central processing units 1104, and a peripherals interface 1106. The memory interface 1102, the one or more processors 1104 and/or the peripherals interface 1106 can be separate components or can be integrated in one or more integrated circuits. The various components in the computing device 1100 can be coupled by one or more communication buses or signal lines.

Sensors, devices, and subsystems can be coupled to the peripherals interface 1106 to facilitate multiple functionalities. For example, a motion sensor 1110, a light sensor 1112, and a proximity sensor 1114 can be coupled to the peripherals interface 1106 to facilitate orientation, lighting, and proximity functions. Other sensors 1116 can also be connected to the peripherals interface 1106, such as a global navigation satellite system (GNSS) (e.g., GPS receiver), a temperature sensor, a biometric sensor, magnetometer or other sensing device, to facilitate related functionalities.

A camera subsystem 1120 and an optical sensor 1122, e.g., a charged coupled device (CCD) or a complementary metal-oxide semiconductor (CMOS) optical sensor, can be utilized to facilitate camera functions, such as recording photographs and video clips. The camera subsystem 1120 and the optical sensor 1122 can be used to collect images of a user to be used during authentication of a user, e.g., by performing facial recognition analysis.

Communication functions can be facilitated through one or more wireless communication subsystems 1124, which can include radio frequency receivers and transmitters and/or optical (e.g., infrared) receivers and transmitters. The specific design and implementation of the communication subsystem 1124 can depend on the communication network(s) over which the computing device 1100 is intended to operate. For example, the computing device 1100 can include communication subsystems 1124 designed to operate over a GSM network, a GPRS network, an EDGE network, a Wi-Fi or WiMax network, and a Bluetooth™ network. In particular, the wireless communication subsystems 1124 can include hosting protocols such that the device 100 can be configured as a base station for other wireless devices.

An audio subsystem 1126 can be coupled to a speaker 1128 and a microphone 1130 to facilitate voice-enabled functions, such as speaker recognition, voice replication, digital recording, and telephony functions. The audio subsystem 1126 can be configured to facilitate processing voice commands, voiceprinting and voice authentication, for example.

The I/O subsystem 1140 can include a touch-surface controller 1142 and/or other input controller(s) 1144. The touch-surface controller 1142 can be coupled to a touch surface 1146. The touch surface 1146 and touch-surface controller 1142 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 1146.

The other input controller(s) 1144 can be coupled to other input/control devices 1148, such as one or more buttons, rocker switches, thumb-wheel, infrared port, USB port, and/or a pointer device such as a stylus. The one or more buttons (not shown) can include an up/down button for volume control of the speaker 1128 and/or the microphone 1130.

In one implementation, a pressing of the button for a first duration can disengage a lock of the touch surface 1146; and a pressing of the button for a second duration that is longer than the first duration can turn power to the computing device 1100 on or off. Pressing the button for a third duration can activate a voice control, or voice command, module that enables the user to speak commands into the microphone 1130 to cause the device to execute the spoken command. The user can customize a functionality of one or more of the buttons. The touch surface 1146 can, for example, also be used to implement virtual or soft buttons and/or a keyboard.

In some implementations, the computing device 1100 can present recorded audio and/or video files, such as MP3, AAC, and MPEG files. In some implementations, the computing device 1100 can include the functionality of an MP3 player, such as an iPod™. The computing device 1100 can, therefore, include a 36-pin connector that is compatible with the iPod. Other input/output and control devices can also be used.

The memory interface 1102 can be coupled to memory 1150. The memory 1150 can include high-speed random access memory and/or non-volatile memory, such as one or more magnetic disk storage devices, one or more optical storage devices, and/or flash memory (e.g., NAND, NOR). The memory 1150 can store an operating system 1152, such as Darwin, RTXC, LINUX, UNIX, OS X, WINDOWS, or an embedded operating system such as VxWorks.

The operating system 1152 can include instructions for handling basic system services and for performing hardware dependent tasks. In some implementations, the operating system 1152 can be a kernel (e.g., UNIX kernel). In some implementations, the operating system 1152 can include instructions for performing voice authentication. For example, operating system 1152 can implement the adaptive image loading features as described with reference to FIGS. 1-10.

The memory 1150 can also store communication instructions 1154 to facilitate communicating with one or more additional devices, one or more computers and/or one or more servers. The memory 1150 can include graphical user interface instructions 1156 to facilitate graphic user interface processing; sensor processing instructions 1158 to facilitate sensor-related processing and functions; phone instructions 1160 to facilitate phone-related processes and functions; electronic messaging instructions 1162 to facilitate electronic-messaging related processes and functions; web browsing instructions 1164 to facilitate web browsing-related processes and functions; media processing instructions 1166 to facilitate media processing-related processes and functions; GNSS/Navigation instructions 1168 to facilitate GNSS and navigation-related processes and instructions; and/or camera instructions 1170 to facilitate camera-related processes and functions.

The memory 1150 can store other software instructions 1172 to facilitate other processes and functions, such as the adaptive image loading processes and functions as described with reference to FIGS. 1-10.

The memory 1150 can also store other software instructions 1174, such as web video instructions to facilitate web video-related processes and functions; and/or web shopping instructions to facilitate web shopping-related processes and functions. In some implementations, the media processing instructions 1166 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 1150 can include additional instructions or fewer instructions. Furthermore, various functions of the computing device 1100 can be implemented in hardware and/or in software, including in one or more signal processing and/or application specific integrated circuits.

What is claimed is:

1. A method comprising:

receiving, by a computing device, a user selection of an image, the computing device storing corresponding thumbnail, preview and master versions of the image, wherein the preview version of the image is designated for loading before the master version of the image is loaded;

in response to the user selection, displaying on a display of the computing device the thumbnail version of the image;

after displaying the thumbnail version and prior to loading either the master version or the preview version, determining, by the computing device, that a first load time associated with the master version is less than a threshold load time, the threshold load time based on a second load time associated with the preview version, and, in response, determining that the master version of the selected image should be loaded into memory of the computing device instead of the preview version;

responsive to determining that the master version of the selected image should be loaded into memory of the computing device instead of the preview version, loading the master version of the image into the memory of the computing device instead of the preview version; and displaying the master version of the image instead of the preview version, wherein the threshold load time comprises the second load time multiplied by a coefficient, and wherein the threshold load time is different than the second load time.

2. The method of claim 1, wherein displaying the master version includes omitting loading the preview version into memory of the computing device.

3. The method of claim 1, wherein loading the master version includes loading the master version when the first load time is less than a maximum load time.

4. The method of claim 1, wherein the first load time and the second load time are determined based on measured load times associated with previously loaded images.

5. The method of claim 1, further comprising:
delaying the loading of the master version based on an expected dwell time, where the expected dwell time is determined based on the amount of time that each of a previous number of images were displayed.

6. The method of claim 5, wherein determining the expected dwell time comprises determining an average amount of time the user has dwelled on a previous number of images.

7. The method of claim 6, comprising comparing the expected dwell time to the first load time associated with the master version and an the second load time associated with the preview version to determine whether the master version, the preview version, or neither can be loaded within the expected dwell time, and in response, choosing the master version, the preview version, or neither for loading.

8. The method of claim 1, further comprising:
delaying the loading of the master version based on the first load time associated with the master version of the image, where the first load time is determined based on the amount of time that the computing device took to load each of a previous number of images.

9. The method of claim 1, wherein the master version comprises a higher resolution than the preview image.

10. A non-transitory computer-readable medium including one or more sequences of instructions which, when executed by one or more processors, causes:
receiving, by a computing device, a user selection of an image, the computing device storing corresponding thumbnail, preview and master versions of the image, wherein the preview version of the image is designated for loading before the master version of the image is loaded;
in response to the user selection, displaying on a display of the computing device the thumbnail version of the image;
after displaying the thumbnail version and prior to loading either the master version or the preview version, determining, by the computing device, that a first load time associated with the master version is less than a threshold load time, the threshold load time based on a second load time associated with the preview version, and, in response, determining that the master version of the selected image should be loaded into memory of the computing device instead of the preview version;
responsive to determining that the master version of the selected image should be loaded into memory of the computing device instead of the preview version, loading the master version of the image into the memory of the computing device instead of the preview version; and
displaying the master version of the image instead of the preview version,
wherein the threshold load time comprises the second load time multiplied by a coefficient, and wherein the threshold load time is different than the second load time.

11. The non-transitory computer-readable medium of claim 10, wherein the instructions that cause displaying the master version include instructions that cause omitting loading the preview version into memory of the computing device.

12. The non-transitory computer-readable medium of claim 10, wherein the instructions that cause loading the master version include instructions that cause loading the master version when the first load time is less than a maximum load time.

13. The non-transitory computer-readable medium of claim 10, wherein the first load time and the second load time are determined based on measured load times associated with previously loaded images.

14. The non-transitory computer-readable medium of claim 10, wherein the instructions cause:
delaying the loading of the master version based on an expected dwell time, where the expected dwell time is determined based on the amount of time that each of a previous number of images were displayed.

15. The non-transitory computer-readable medium of claim 10, wherein the instructions cause:
delaying the loading of the master version based on the first load time associated with the master version of the image, where the first load time is determined based on the amount of time that the computing device took to load each of a previous number of images.

16. A system comprising:
one or more processors;
a display; and
a non-transitory computer-readable medium including one or more sequences of instructions which, when executed by one or more processors, causes:
receiving, by a computing device, a user selection of an image, the computing device storing corresponding thumbnail, preview and master versions of the image, wherein the preview version of the image is designated for loading before the master version of the image is loaded;
in response to the user selection, displaying on a display of the computing device the thumbnail version of the image;
after displaying the thumbnail version and prior to loading either the master version or the preview version, determining, by the computing device, that a first load time associated with the master version is less than a threshold load time, the threshold load time based on a second load time associated with the preview version, and, in response, determining that the master version of the selected image should be loaded into memory of the computing device instead of the preview version;
responsive to determining that the master version of the selected image should be loaded into memory of the computing device instead of the preview version, loading the master version of the image into the memory of the computing device instead of the preview version; and
displaying the master version of the image instead of the preview version,
wherein the threshold load time comprises the second load time multiplied by a coefficient, and wherein the threshold load time is different than the second load time.

17. The system of claim 16, wherein the instructions that cause displaying the master version include instructions that cause omitting loading the preview version into the memory of the system.

18. The system of claim 16, wherein the instructions that cause loading the master version include instructions that cause loading the master version when the first load time is less than a maximum load time.

19. The system of claim 16, wherein the first load time and the second load time are determined based on measured load times associated with previously loaded images.

20. The system of claim 16, wherein the instructions cause:
  delaying the loading of the master version based on an expected dwell time, where the expected dwell time is determined based on the amount of time that each of a previous number of images were displayed.

21. The system of claim 16, wherein the instructions cause:
  delaying the loading of the master version based on the first load time associated with the master version of the image, where the first load time is determined based on the amount of time that the system took to load each of a previous number of images.

22. A method comprising:
  receiving, by a computing device, a user selection of an image, the computing device storing corresponding preview and master versions of the image, wherein the preview version of the image is designated for loading before the master version of the image is loaded;
  in response to the user selection and prior to loading either the master version or the preview version, determining, by the computing device, that a first load time associated with the master version is less than a threshold load time, the threshold load time based on a second load time associated with the preview version, and, in response, determining that the master version of the selected image should be loaded into memory of the computing device instead of the preview version;
  responsive to determining that the master version of the selected image should be loaded into memory of the computing device instead of the preview version, loading the master version of the image into the memory of the computing device instead of the preview version; and
  displaying the master version of the image instead of the preview version,
  wherein the threshold load time comprises the second load time multiplied by a coefficient, and wherein the threshold load time is different than the second load time.

* * * * *

UNITED STATES PATENT AND TRADEMARK OFFICE
CERTIFICATE OF CORRECTION

PATENT NO. : 9,971,844 B2  
APPLICATION NO. : 14/169086  
DATED : May 15, 2018  
INVENTOR(S) : David Koski and Nikhil Bhatt Page 1 of 1

It is certified that error appears in the above-identified patent and that said Letters Patent is hereby corrected as shown below:

In the Claims

Column 13, Line 19, after "and" delete "an".

Signed and Sealed this  
Seventh Day of August, 2018

Andrei Iancu  
*Director of the United States Patent and Trademark Office*